United States Patent
Wu et al.

(10) Patent No.: US 7,842,651 B2
(45) Date of Patent: Nov. 30, 2010

(54) SILICATE DRILLING FLUID COMPOSITION CONTAINING LUBRICATING AGENTS AND USES THEREOF

(75) Inventors: Anming Wu, Calgary (CA); Xing Yan, Sichuan (NC)

(73) Assignee: Chengdu Cationic Chemistry Company, Inc., Sichuan (CN)

( * ) Notice: Subject to any disclaimer, the term of this patent is extended or adjusted under 35 U.S.C. 154(b) by 122 days.

(21) Appl. No.: 12/330,150

(22) Filed: Dec. 8, 2008

(65) Prior Publication Data

US 2009/0170730 A1    Jul. 2, 2009

Related U.S. Application Data

(60) Provisional application No. 61/014,516, filed on Dec. 18, 2007.

(51) Int. Cl.
C09K 8/28    (2006.01)
E21B 21/00    (2006.01)

(52) U.S. Cl. .................. 507/134; 175/65; 507/120; 507/135

(58) Field of Classification Search .............. 507/134, 507/120, 135; 175/65
See application file for complete search history.

(56) References Cited

U.S. PATENT DOCUMENTS

| | | | |
|---|---|---|---|
| 2,133,759 A | 10/1938 | Vail | |
| 3,716,486 A * | 2/1973 | Perricone | 507/127 |
| 4,123,367 A * | 10/1978 | Dodd | 507/140 |
| 4,159,255 A | 6/1979 | Gainer et al. | |
| 5,337,824 A | 8/1994 | Cowan | |
| 5,358,044 A | 10/1994 | Hale | |
| 5,361,842 A | 11/1994 | Hale | |
| 5,535,834 A * | 7/1996 | Naraghi et al. | 175/40 |
| 5,908,814 A | 6/1999 | Patel | |
| 6,152,227 A | 11/2000 | Lawson | |
| 6,211,119 B1 * | 4/2001 | Herold et al. | 507/103 |
| 6,248,698 B1 | 6/2001 | Mullen | |
| 6,355,600 B1 | 3/2002 | Norfleet | |
| 6,642,183 B1 | 11/2003 | Bass | |
| 6,716,799 B1 | 4/2004 | Mueller | |
| 6,806,235 B1 | 10/2004 | Mueller | |
| 7,137,459 B1 | 11/2006 | Dearing, Jr. | |
| 7,226,895 B2 | 6/2007 | Xiang | |

FOREIGN PATENT DOCUMENTS

| | | |
|---|---|---|
| CA | 1122594 | 4/1982 |
| CA | 1289546 | 9/1991 |
| CA | 2049430 | 2/1992 |
| CA | 1340486 | 4/1999 |
| CA | 2335762 | 1/2000 |
| CA | 2273264 | 4/2007 |

OTHER PUBLICATIONS

Canter, N., "Special Report: Trends in extreme pressure additives", Tribology & Lubrication Technology, Sep. 2007, pp. 10-17.

* cited by examiner

*Primary Examiner*—Timothy J. Kugel
(74) *Attorney, Agent, or Firm*—Rothwell, Figg, Ernst & Manbeck, P.C.

(57) ABSTRACT

The present disclosure relates to the compositions of a water-based silicate drilling fluid comprising: (1) alkali metal silicates; (2) cationic polyacrylamide; (3) a lubricant composition; and (4) other conventional drilling fluid additives. The lubricant composition comprises a lubricating effective amount of a carrier oil and one or more lubricants selected from lecithins, sulfurized vegetable and/or lard oils or modified castor oil.

35 Claims, No Drawings

SILICATE DRILLING FLUID COMPOSITION CONTAINING LUBRICATING AGENTS AND USES THEREOF

FIELD OF THE DISCLOSURE

The present disclosure is in the field of silicate-based drilling fluid compositions. In particular, the silicate drilling fluid compositions of the present disclosure include a lubricant composition.

BACKGROUND OF THE DISCLOSURE

During the drilling operations of oil and gas wells, the troublesome gumbo shale formations are often encountered. Such formations, which comprise the highly reactive shale clays, lose physical and dimensional integrity when they are exposed to the pure water or the water filtration of general water-based drilling fluids. Great difficulty has always been experienced in drilling these types of shale formations.

Although the oil-based drilling fluids (pure oil drilling fluids, invert emulsion "w/o" drilling fluids and synthetic-based drilling fluids) can effectively deal with the reactive shale clay, they pose the problems of safety (due to flamability), environmental hazards (as the drilling cuttings contain hydrocarbons), and interference with oil and gas well logging operations. In order to suppress the swelling and dispersing of the shale clays in water-based drilling fluids, a variety of special water-based drilling fluids have been developed and used in field operations for many years. They are as follows:

(1) Potassium drilling fluids containing potassium salts like potassium chloride, potassium sulfate, potassium formate, potassium acetate, and partially hydrolyzed polyacrylamide (PHPA);
(2) Calcium drilling fluids containing gypsum, lime, calcium chloride or calcium nitrate;
(3) Cationic polymer drilling fluids containing quaternary ammonium organic cationic or zwitterionic polymers;
(4) MMH drilling fluids containing mixed metal hydroxides;
(5) Polyol drilling fluids containing poly-glycol or other polyol compounds;
(6) Amine drilling fluids containing organic amine or tetramethyl ammonium;
(7) Silicate drilling fluids containing alkali metal silicates.

The use of silicate as a drilling fluid component is well established. Silicate has been used since the 1930's as an effective means of stabilizing shale formations (U.S. Pat. No. 2,133,759). Despite being an effective shale stabilizer, silicate never achieved early, widespread success, due to certain advantages held by oil-based drilling fluids. Oil-based drilling fluids offer ease of use, are not prone to gellation or precipitation, and provide good lubricity between drill string and well bore, as measured by the coefficients of friction in the range of 0.10 to 0.18 compared with a range of 0.18 to 0.22 for water-based drilling fluids.

Recently, environmental pressures have pushed to improve the performance deficiencies in silicate drilling fluids. A suitable replacement for oil-based drilling fluids in some of the more difficult fields has been a goal of the drilling industry for many years. Many researchers have made improvements on the old silicate drilling fluids which have been used from the 1930's to 1950's. About 10 U.S. patents (U.S. Pat. Nos. 5,337,824; 5,358,044; 5,361,842; 6,152,227; 6,248,698; 6,642,183; 6,716,799; 6,806,235; 7,137,459; 7,226,895) related to silicate drilling fluids have issued since the 1990's. Recently, potassium silicate drilling fluid has become a more preferred inhibitive water-based drilling fluid for drilling reactive shale formations. The industry is witnessing increasingly successful wells drilled with potassium silicate drilling fluids. Potassium silicate drilling fluids provide very favorable well bore stability for shale sequences where traditionally only oil-based drilling fluids were successful.

Potassium silicate drilling fluids still experience high coefficients of friction between drill string and well bore, owing to the silicate coating on the surfaces, making the surfaces of drill string and well bore rough.

A few attempts have been made to improve the lubricity of silicate drilling fluids. Lubricants comprising a partial glyceride of predominantly unsaturated fatty acids having from about 16 to 24 carbon atoms (U.S. Pat. No. 6,806,235), or fatty alcohols (U.S. Pat. No. 6,716,799), or tetra alkyl ammonium (U.S. Pat. No. 6,642,183 or Canadian patent no. 2,335,762) have been disclosed for improving the lubricity of the silicate drilling fluids. The field use of these compositions has not provided favorable results.

Boundary lubricity additives typically function by adsorbing on the metal surface to form a film that will reduce metal-to-metal contact. This function is attained because the boundary lubricity additive has a polar head group that can interact with the metal surface and a tail group that is compatible with the lubricant carrier oil (mineral oil, synthetic base-stock or water). A classic example of a boundary lubricity additive is an ester which could be available as natural product (canola oil, lard oil, tall oil fatty acid etc.) or as a functionalized molecule (monobasic ester, di-ester, polyester, complex ester).

As the conditions under which metal-to-metal interactions become severe due to higher temperatures and pressures, the lubricant becomes more stressed. The distance between the metal surfaces decreases to the point where rubbing occurs and the chances for welding become greater. Traditional boundary lubrication additives do not remain on the metal surface and cannot prevent the increased friction, wear and damage to the machinery seen under these conditions. Extreme pressure (EP) additives have been used to enable specific applications operating under these conditions to continue. There are four main types of EP additives that are based on chlorinated, phosphorus, sulfur and overbased sulfonate species (see Canter N. "Special Report: Trends in extreme pressure additives" published on "TRIBOLOGY & LUBRICATION TECHNOLOGY", September 2007, page 10~17).

Over the past at least 20 years, there have been many discussions and some regulations enacted to limit the use of chlorinated paraffin. For example, the European Union (EU) considers the most widely used chlorinated paraffin type, known as medium chain chlorinated paraffin, to be toxic to marine life.

Canadian patent application no. 2,049,430 discloses that concentrated canola phosphatides (lecithins) are suited for use as lubricants for gear, cutting oils, finishing oils and for use in oil-based and water-based drilling fluids, due to their surprising properties of good film strength and lubricity at temperatures below 250° C.

Canadian patent nos. 1,122,594, 1,289,546, 1,340,486 and 2,273,264 disclose that sulfurized olefin and polysulfurized hydrocarbons are useful as extreme pressure additives in metal working oil.

U.S. Pat. No. 4,159,255 discloses a modified castor oil lubricant for refrigerator systems employing halocarbon refrigerants.

U.S. Pat. Nos. 5,908,814 and 6,355,600 disclose cationic polyacrylamides with lower cationic charge for use in water-based drilling fluids to suppress clay swelling.

SUMMARY OF THE DISCLOSURE

The present disclosure describes silicate drilling fluid compositions with enhanced lubricity that provide well bore stability for shale sequences and which have a lubricity comparable with that of oil-based drilling fluids.

Accordingly, the present disclosure relates to a silicate drilling fluid composition comprising:
(a) water as continuous phase;
(b) alkali metal silicates;
(c) a lubricating effective amount of a lubricant composition comprising a carrier oil and one or more lubricants selected from:
   (i) lecithins,
   (ii) sulfurized vegetable oil, sulfurized lard oil, sulfurized vegetable esters, and/or sulfurized lard esters, and
   (iii) modified castor oil;
(d) cationic polyacrylamides; and
(e) optionally, other conventional silicate drilling fluid additives selected from one or more of pre-hydrated clay mineral viscosifiers, polymer viscosifiers, filtration reducers, weighting agents, foaming lighting agents, bridging agents, defoamers and high temperature stabilizers.

The present disclosure further includes a process for imparting lubricity to an aqueous drilling fluid comprising:
(a) providing an aqueous drilling fluid;
(b) providing a lubricating effective amount of a lubricant composition comprising a carrier oil and one or more lubricants selected from:
   (i) lecithins,
   (ii) sulfurized vegetable oil, sulfurized lard oil, sulfurized vegetable esters, and/or sulfurized lard esters, and
   (iii) modified castor oil;
(c) introducing the lubricant composition into the aqueous drilling fluid.

The present disclosure also includes a well drilling process comprising circulating a drilling fluid composition of the present disclosure in a borehole during drilling. The present disclosure further includes the use of the drilling fluid composition of the present disclosure in drilling processes.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

DETAILED DESCRIPTION OF THE DISCLOSURE

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(I) Compositions of the Disclosure

The present disclosure relates to a silicate drilling fluid composition comprising:
(a) water as continuous phase;
(b) alkali metal silicates;
(c) a lubricating effective amount of a lubricant composition comprising a carrier oil and one or more lubricants selected from:
   (i) lecithins,
   (ii) sulfurized vegetable oil, sulfurized lard oil, sulfurized vegetable esters, and/or sulfurized lard esters, and
   (iii) modified castor oil;
(d) cationic polyacrylamides; and
(e) optionally, other conventional silicate drilling fluid additives selected from one or more of pre-hydrated clay mineral viscosifiers, polymer viscosifiers, filtration reducers, weighting agents, foaming lighting agents, bridging agents, defoamers and high temperature stabilizers.

The term "lubricating effective amount" as used herein refers to an amount of a lubricant composition effective to, when included in a silicate drilling fluid composition, increases the lubricity of the silicate drilling fluid composition as compared to the lubricity of that same composition obtained without the lubricant composition. The amount in a silicate drilling fluid composition of a given lubricant composition of the present disclosure that will correspond to such an effective amount will vary depending upon various factors, including, for example, the formation being drilled, the equipment be used, the environmental conditions, and the like, but can nevertheless be routinely determined by one skilled in the art.

The silicates useful in the compositions of the present disclosure include materials in solution as well as hydrated solids and anhydrous silicate powders. In embodiments of the disclosure, the alkali metal silicates are selected from sodium silicates and potassium silicates, or mixtures thereof. In particular, the alkali metal silicates have molar ratios of $SiO_2$:$Na_2O$ or $SiO_2$:$K_2O$ of about 1.5 to about 4.0. In an embodiment, the potassium silicate is a potassium silicate solution (29.1% Potassium Silicate Solution with the molar ratio of $SiO_2$:$K_2O$=4:1) from National Silicates. Potassium silicate contains potassium ions which have a strong ability to suppress shale clay swelling, accordingly the use of potassium silicates is a suitable embodiment of the present disclosure. The alkali metal silicate is suitably used at a concentration of about 1 kg to about 100 kg per cubic meter of drilling fluid composition. The alkali metal silicates may be added to the silicate drilling fluids in the form of solutions or solid powders, depending on the rig equipment and weather conditions as would be known to a person skilled in the art.

The silicate drilling fluid compositions according to the present disclosure contain a lubricant composition that is comprised of a synergistic combination of extreme pressure (EP) lubricants. The lubricant composition comprises a lubricating effective amount of a lubricant composition comprising a carrier oil and one or more lubricants selected from:
(i) lecithins,
(ii) sulfurized vegetable oil, sulfurized lard oil, sulfurized vegetable esters, and/or sulfurized lard esters, and
(iii) modified castor oil;

In an embodiment of the present disclosure, the lecithins are soybean lecithins, canola oil lecithins, or mixtures thereof. In a further embodiment, the lecithins are present in an amount of about 10% to about 40% by volume of the lubricant composition. In a further embodiment of the disclosure, the sulfurized vegetable oil, sulfurized lard oil, sulfurized vegetable esters and sulfurized lard esters are products of sulfur reacting with the vegetable oil, lard oil, vegetable esters, and lard esters with a ratio of sulphur:oils/esters of about 0.01 to about 0.05 by weight. In another embodiment, the sulfurized vegetable oil, sulfurized lard oil, sulfurized vegetable esters, and/or sulfurized lard esters are present in an amount of about 10% to about 40% by volume of the lubricant composition. In yet another embodiment of the present disclosure, the modified castor oil is ethoxylated or sulfonated castor oil, or mixtures thereof, prepared by reacting ratios of ethylene oxide:castor oil or sulphuric acid:castor oil in the range of about 0.01 to about 0.06 by weight. In another embodiment, the modified castor oil is present in an amount of about 2% to about 10% by volume of the lubricant composition. It is a further embodiment that the lubricant composition is present in the silicate drilling fluid composition in an amount of about 5 to about 40 liters per cubic meter of the drilling fluid composition.

In an embodiment of the disclosure, the carrier oil is a paraffin carrier oil. In another embodiment, the paraffin carrier oil is a saturated hydrocarbon with eight to eighteen carbon atoms, or mixtures thereof. In another embodiment, the paraffin carrier oil is present in an amount of about 10% to about 90% by volume of the lubricant composition. It will be understood by those skilled in the art that the carrier oil can be any oil which is able to mix with the lubricants and/or act as a carrier for the lubricants.

In an embodiment of the disclosure, the lubricant composition is a mixture of sulfurized vegetable oil with 5% sulfur content and liquid paraffin carrier oil (KT 810), a mixture of sulfonated castor oil with 0.5% sulfonation degree and liquid paraffin carrier oil (KT 811), a mixture of sulfurized vegetable oil with 2% sulfur content and liquid paraffin carrier oil (KT 812), a mixture of lecithin and liquid paraffin carrier oil (KT 813), a mixture of sulfurized vegetable oil with 5% sulfur content, sulfonated castor oil with 0.5% sulfonation degree and liquid paraffin carrier oil (KT 814), a mixture of sulfurized vegetable oil with 5% sulfur content, lecithin and liquid paraffin carrier oil (KT 815), a mixture of sulfurized vegetable oil with 5% sulfur content, lecithin, sulfonated castor oil with 0.5% sulfonation degree and liquid paraffin carrier oil (KT 816), a mixture of sulfurized vegetable oil with 2% sulfur content, lecithin and liquid paraffin carrier oil (KT 817) or a mixture of sulfonated castor oil with 0.5% sulfonation degree and liquid paraffin carrier oil (KT 818). All of the KT lubricants are supplied from the Chengdu Cationic Chemistry Company.

Cationic polyacrylamides useful in the compositions of the present disclosure are those having a lower cationic charge, that is a cationic charge that is compatible with the alkali metal silicates and conventional anionic drilling fluid additives. The cationic polyacrylamides are used to flocculate and remove fine solids of the cutting from the drilling fluids to enhance lubricity. In an embodiment of the disclosure, the cationic polyacrylamides are copolymers of an acrylamide monomer and an acrylic or allyl monomer containing a quaternary ammonium group, or mixtures thereof. In a further embodiment, the acrylic or allyl monomer containing a quaternary ammonium group is selected from diallyl dimethyl ammonium chloride (DADMAC) and 2-methacryloyloxy-ethyltri-methylammonium chloride (DMC). In another embodiment, the average molecular weight of the cationic polyacrylamide is in about 10,000 to about 10,000,000 grams per mole of polymer. In yet another embodiment, the cationic polyacrylamide has a cationic charge of about 0.2 to about 10 moles of cationic monomer per 100 moles of acrylamide monomer. In a further embodiment of the disclosure, the cationic polyacrylamide has an average molar weight of 5 million and the cation degree is 3.5% by weight. In another embodiment of the present disclosure, the cationic polyacrylamide is present in an amount of about 0.01 to about 2 kg per cubic meter of the drilling fluid composition. In a further embodiment of the present disclosure, the cationic polyacrylamide is added to the silicate drilling fluids in the form of pre-dissoloved and hydrated cationic polyacrylamide aqueous solutions.

The water in the continuous phase of the silicate drilling fluid composition may be fresh water or an aqueous salt solution, for example, sodium and/or potassium salt water solutions. In an embodiment of the disclosure, the sodium and/or potassium salts are selected from NaCl, KCl, $NaNO_3$, $KNO_3$, $Na_2SO_4$, $K_2SO_4$, HCOONa, HCOOK, $CH_3COONa$, and $CH_3COOK$. In a further embodiment, the salts are present in the water solution in a concentration of about 20 to about 100 kg per cubic meter of water.

The compositions of the present disclosure further include one or more additive commonly used in silicate drilling fluids. Examples of such additives include, but are not limited to from one or more of pre-hydrated clay mineral viscosifiers, polymer viscosifiers, filtration reducers, weighting agents, foaming lighting agents, bridging agents, defoamers and high temperature stabilizers. The type and amount of additives would depend on a number of factors, including, for example, the type of formation being drilled, the type of equipment and the temperature and pressure, but can be determined by a person skilled in the art. (See, for example, George R. Gray and H. C. H. Darley entitled "Composition in Properties of Oil Well Drilling Fluids", 4th Edition, 1980/81, Gulf Publishing Company Houston and the extensive technical and patent literature cited therein and in the handbook entitled "Applied Drilling Engineering" by Adam T. Borgoyne, Jr. et al., First Printing Society of Petroleum Engineers, Richardson, Tex. (USA)).

To drill in deep shale formations, it is desirable to mud up the silicate drilling fluids with the pre-hydrated bentonite, polymer viscosifiers, such as biopolymers (for example, xanthan gum), and drilling fluid filtration reducers, such as, polyanionic cellulose and drilling grade starches. The swelling clays such as bentonite are extensively used in the drilling fluid industry as rheology agents. As well as providing a useful rheology, the bentonite is resistant to high temperature and high pressure (HTHP). As silicates inhibit the bentonite from hydrating, the bentonite is desirably pre-hydrated in fresh water with soda ash before being added to the silicate drilling fluid composition. In an embodiment of the disclosure, the concentration of bentonite in the silicate drilling fluid composition is from about 0 to about 40 kg per cubic meter of the drilling fluid composition. In a further embodiment, the concentration of polymer viscosifiers such as xanthan gum is about 0.5 to about 3 kg per cubic meter of the drilling fluid composition. In another embodiment of the disclosure, the concentration of polyanionic cellulose is about 1 to 6 kg per cubic meter of the drilling fluids. In another embodiment, the concentration of drilling grade starches is about 2 to about 10 kg per cubic meter of the drilling fluid composition. In an embodiment, the drilling grade starch is pre-gelled corn starch supplied from CETCO Technologies.

In a further embodiment, the xanthan gum is supplied from Shangdon Deoson Corporation.

When high pressure formations are drilled, it is desirable to increase the density of the silicate drilling fluids with weighting agents such as barite or hematite. The density of the silicate drilling fluid composition can reach as high as about 1900 kg per cubic meter of the drilling fluid composition. When the low density of silicate drilling fluids are needed for drilling low pressure formations under balance, the density of the silicate drilling fluid compositions can be lowered by the addition of foaming lighting agents, such as sulfonated surfactants with the sulfonation degrees in the range of about 0.3 to about 1.0, to a density as low as about 300 kg per cubic meter of the drilling fluid composition.

For deep formation and high bottom hole temperature oil and gas wells, it is desirable to add high temperature stabilizers to the silicate drilling fluids to prevent the polymers in the drilling fluids from being oxidized or hydrolyzed. The silicate drilling fluids can be used for oil and gas well drilling whose bottom hole temperatures are below 120° C.

For silicate drilling fluids with a low solid content, it may be desirable to add bridging agents, for example, calcium carbonate or sulfonated asphalt particles, to bridge to the pores of the formations. In an embodiment of the disclosure, the concentration of the bridging agents is about 5 to about 30 kg per cubic meter of the drilling fluid composition.

The silicate drilling fluids may be used repeatedly to lower the drilling fluid cost for the operators. After the silicate drilling fluids have been used for a certain period of time, the silicate drilling fluids may begin to foam. Accordingly, it may also be desirable to add alcohol based or silicon based defoamers to defoam the silicate drilling fluid composition. In an embodiment of the disclosure, the concentration of the defoamer is about 0.1 to about 1.0 liter per cubic meter of the drilling fluid composition.

The compositions of the present disclosure may be prepared using conventional techniques. For example, chemical addition tanks and hoppers may be used to add the lubricant and other additives to silicate drilling fluids. It is suitable to prepare silicate drilling fluids according to the present invention by slowly adding the lubricant composition to the silicate mud, i.e., either to the pre-mixed aqueous silicate drilling fluid composition, or to the active online silicate drilling fluid composition while drilling. In that way, higher levels of lubricant composition in the silicate drilling fluid can be achieved, due to limiting the adsorption loss of the lubricant composition on the drilling cuttings.

(II) Processes of the Disclosure

The present disclosure further includes a process for imparting lubricity to an aqueous drilling fluid comprising:
(a) providing an aqueous drilling fluid;
(b) providing a lubricating effective amount of a lubricant composition comprising a carrier oil and one or more lubricants selected from:
  (i) lecithins,
  (ii) sulfurized vegetable oil, sulfurized lard oil, sulfurized vegetable esters, and/or sulfurized lard esters, and
  (iii) modified castor oil; and
(c) introducing the lubricant composition into the aqueous drilling fluid.

In an embodiment of the disclosure, the lubricant composition comprises a lubricating effective amount of a lubricant composition comprising a carrier oil and one or more lubricants selected from:

(i) about 10% to about 40% lecithins (e.g. from soybean and/or canola oils);
(ii) about 10% to about 40% sulfurized vegetable oil, sulfurized lard oil, sulfurized vegetable esters, and/or sulfurized lard esters; and
(iii) about 2% to about 10% modified castor oil (ethoxylated or sulfonated).

In another embodiment, the carrier oil is present in an amount by volume of about 10% to about 90% of the lubricant composition.

The present disclosure also includes a well drilling process comprising circulating a drilling fluid composition of the present disclosure in a borehole during drilling. The present disclosure further includes the use of the drilling fluid composition of the present disclosure in drilling processes.

The following non-limiting examples are illustrative of the present invention:

EXAMPLES

The cationic polyacrylamide (CPAM) was supplied by Chengdu Cationic Chemistry Company. Polyanionic Cellulose (PAC R/LV) was provided by Luzhou North Qiaofeng Chemical Company. Xanthan Gum (Ziboxan®, drilling grade) was provided by Shandong Deoson Corporation. Drilling grade starch was provided by Hubei Saidy Technology Development Company. Bentonite (Drill Gel®) was provided by CETCO Technologies (Suzhou) Company. Potassium silicate (Ecodrill® 317) was provided by National Silicates, Canada. The extreme pressure lubricants (KT 810, KT 811, KT 812, KT 813, KT 814, KT 815, KT 816, KT 817, and KT 818) were provided by Chengdu Cationic Chemistry Company. A Hamilton Beach® mixer was used to mix the drilling fluid compositions. An EP/Lubricity Tester Model 212 Fann Instrument Company was used to test the coefficient of friction of the prepared silicate drilling fluids. A Viscometer Model 35 from Fann Instrument Company was used to test viscosity and an API Filter Press from Fann Instrument Company was used to test the filtrate loss of drilling fluids.

Example 1

Silicate Drilling Fluid Preparation

To tap water was added 1 kg/m$^3$ cationic polyacrylamide (average molar weight is 5 million and cation degree is 3.5% by weight), 2 kg/m$^3$ of polyanionic cellulose regular (PAC R), 1 kg/m$^3$ of xanthan gum, and 6 kg/m$^3$ of drilling grade starch. This mixture was then mixed for 20 minutes using a Hamilton Beach mixer, at which point 80 L/m$^3$ of Ecodrill 317® was added and further mixed for 5 minutes. To the resultant mixture was added 20 kg/m$^3$ of Drill Gel® and then varying amounts (0~30 L/m$^3$) of extreme pressure drilling fluid lubricants (KT 810-KT 818). These mixtures were then further mixed for 15 minutes.

Example 2

Friction Coefficient Reduction Test of Silicate Drilling Fluids

The coefficient of friction of the silicate drilling fluid compositions as prepared in Example 1 was determined using a Fann EP/Lubricity Tester. The Tester is a standard instrument designed for determining the coefficient of friction of drilling fluids and their additives. During the test, a hardened steel block and a ring are placed in contact with each other in the presence of the drilling fluid to be tested. A load of 150 inch pounds is placed upon a level arm which applies a pressure of between 5,000 and 10,000 pounds per square inch on the drilling fluid to be tested which is between the block and the ring. The ring is rotated at 60 RPM. All the tested drilling fluids were run under these conditions, and, accordingly, the coefficients of the friction of values and torque reduction values are directly comparable to each other. The testing results are shown in Table 1.

Table 1 illustrates that the drilling fluid composition with no lubricant added possessed a coefficient of friction of 0.39. As seen in Table 1, all of the drilling fluid compositions with added lubricant (KT 810, KT 811, KT 812, KT 813, KT 814, KT 815, KT 816, KT 817, and KT 818) resulted in a decrease in the coefficient of friction and a corresponding torque reduction. The lubricant KT 816 at 30 L/m$^3$ resulted in a significant decrease of the coefficient of friction to 0.16 and a corresponding 59.0% torque reduction.

Example 3

Silicate Drilling Fluid Viscosity & Filtration Testing

The rheology of the silicate drilling fluid composition was tested with Viscometer Model 35 from Fann Instrument Company and the filtrate loss of this mud is tested with API Filter Press form Fann Instrument Company. The tested drilling fluid consists of 1 kg/m$^3$ CPAM, 2 kg/m$^3$ PAC R, 6 kg/m$^3$ drilling grade starch, 80 L/m$^3$ of 29.1% potassium silicate solution, 20 kg/m$^3$ bentonite and 20 L/m$^3$ KT 816. The testing results are shown in Table 2.

As illustrated in Table 2, the disclosed drilling fluid has a very good rheology (having a yield point value of 7 Pa) and a very low API filtrate loss (having an API filtrate loss value of 7.6 ml).

While the present disclosure has been described with reference to what are presently considered to be the preferred embodiments, it is to be understood that the disclosure is not limited to the disclosed embodiments. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Silicate Drilling Fluid Lubricity Testing

| Formulation | Coefficient of Friction | Torque Reduction |
|---|---|---|
| Controlled Silicate Drilling Fluid | 0.39 | |
| Controlled Silicate Drilling Fluid + 20 L/m$^3$ KT 810 | 0.33 | 15.4% |
| Controlled Silicate Drilling Fluid + 20 L/m$^3$ KT 811 | 0.36 | 7.7% |
| Controlled Silicate Drilling Fluid + 20 L/m$^3$ KT 812 | 0.34 | 12.8% |
| Controlled Silicate Drilling Fluid + 20 L/m$^3$ KT 813 | 0.27 | 30.8% |
| Controlled Silicate Drilling Fluid + 20 L/m$^3$ KT 814 | 0.31 | 20.5% |
| Controlled Silicate Drilling Fluid + 20 L/m$^3$ KT 815 | 0.23 | 41.0% |
| Controlled Silicate Drilling Fluid + 20 L/m$^3$ KT 816 | 0.19 | 51.3% |
| Controlled Silicate Drilling Fluid + 30 L/m$^3$ KT 816 | 0.16 | 59.0% |
| Controlled Silicate Drilling Fluid + 20 L/m$^3$ KT 817 | 0.28 | 28.2% |
| Controlled Silicate Drilling Fluid + 20 L/m$^3$ KT 818 | 0.37 | 5.1% |

TABLE 2

Silicate Drilling Fluid Viscosity & Filtration Testing Results

| Different Shear Rates: | Torque (at Different Shear Rates): |
|---|---|
| 600 RPM (1022s$^{-1}$) | 38 × 511 (mPa) |
| 300 RPM (511s$^{-1}$) | 26 × 511 (mPa) |
| 200 RPM (340s$^{-1}$) | 20 × 511 (mPa) |
| 100 RPM (170s$^{-1}$) | 14 × 511 (mPa) |
| 6 RPM (5.11s$^{-1}$) | 3 × 511 (mPa) |
| 3 RPM (3.40s$^{-1}$) | 2 × 511 (mPa) |

| Mud Properties Parameters: | Values: |
|---|---|
| Apparent Viscosity at 1022 s$^{-1}$ | 19 (mPa · s) |
| Plastic Viscosity | 12 (mPa · s) |
| Yield Point | 7 (Pa) |
| Gel Strength (10 s/10 min) | 1/1.5 (Pa) |
| API Filtrate Loss at 700 kPa pressure difference for 30 minute and 45.6 cm$^2$ filtration area | 7.6 (ml) |
| API Filtrate Cake Thickness | 1.0 (mm) |

We claim:

1. A silicate drilling fluid composition comprising:
   (a) water as a continuous phase;
   (b) alkali metal silicates;
   (c) a lubricating effective amount of a lubricant composition comprising a carrier oil and one or more lubricants selected from the group consisting of:
      (i) lecithins,
      (ii) sulfurized vegetable oil, sulfurized lard oil, sulfurized vegetable esters, and/or sulfurized lard esters, and
      (iii) modified castor oil;
   (d) cationic polyacrylamides; and
   (e) optionally, other conventional silicate drilling fluid additives selected from the group consisting of pre-hydrated clay mineral viscosifiers, polymer viscosifiers, filtration reducers, weighting agents, foaming lighting agents, bridging agents, defoamers and high temperature stabilizers.

2. The silicate drilling fluid composition according to claim 1, wherein the cationic polyacrylamide is a copolymer of an acrylamide monomer and an acrylic or allyl monomer containing a quaternary ammonium group.

3. The silicate drilling fluid composition according to claim 2, wherein the average molecular weight of the cationic polyacrylamide is about 10,000 to about 10,000,000 grams per mole of polymer.

4. The silicate drilling fluid composition according to claim 3, wherein the average molecular weight of the cationic polyacrylamide is about 5,000,000 grams per mole of polymer.

5. The silicate drilling fluid composition according to claim 2, wherein the acrylic or allyl monomer containing a quaternary ammonium group is selected from diallyl dimethyl ammonium chloride (DADMAC) and 2-methacryloyloxy-ethyltri-methylammonium chloride (DMC).

6. The silicate drilling fluid composition according to claims 2, wherein the cationic polyacrylamide has a cationic charge of about 0.2 to about 10 moles of cationic monomer per 100 moles of acrylamide monomer.

7. The silicate drilling fluid composition according to claim 2, wherein the cationic polyacrylamide is present in an amount of about 0.01 to about 2 kg per cubic meter of the drilling fluid composition.

8. The silicate drilling fluid composition according to claim 1, wherein the water in the continuous phase is fresh water or sodium and/or potassium salt water solutions.

9. The silicate drilling fluid composition according to claim 8, wherein the sodium and/or potassium salts are selected from the group consisting of NaCl, KCl, $NaNO_3$, $KNO_3$, $Na_2SO_4$, $K_2SO_4$, HCOONa, HCOOK, $CH_3COONa$, and $CH_3COOK$.

10. The silicate drilling fluid composition according to claim 9, wherein the salts are present in a concentration of about 20 to about 100 kg per cubic meter of water.

11. The silicate drilling fluid composition according to claim 1, wherein the alkali metal silicates are selected from the group consisting of sodium silicates and potassium silicates.

12. The silicate drilling fluid composition according to claim 1, wherein the alkali metal silicates have molar ratios of $SiO_2:Na_2O$ or $SiO_2:K_2O$ of about 1.5 to about 4.0.

13. The silicate drilling fluid composition according to claim 11, wherein the potassium silicate comprises a 29.1% potassium silicate solution with a molar ratio of $SiO_2:K_2O$ of 4:1.

14. The silicate drilling fluid composition according to claim 1, wherein the carrier oil is a paraffin carrier oil.

15. The silicate drilling fluid composition according to claim 14, wherein the paraffin carrier oil comprises saturated hydrocarbons with eight to eighteen carbon atoms.

16. The silicate drilling fluid composition according to claim 1, wherein the concentration of alkali metal silicates in the silicate drilling fluids composition is about 1 to about 100 kg per cubic meter.

17. The silicate drilling fluid composition according to claim 1, wherein the lecithins are soybean lecithins, canola oil lecithins or mixtures thereof.

18. The silicate drilling fluid composition according to claim 1, wherein the lecithins are present in an amount of about 10% to about 40% by volume of the lubricant composition.

19. The silicate drilling fluid composition according to claim 1, wherein the sulfurized vegetable oil, sulfurized lard oil, sulfurized vegetable esters, and sulfurized lard esters are products of sulfur reacting with the vegetable oil, lard oil, vegetable esters, and lard esters with a ratio of sulphur:oils/esters of about 0.01 to about 0.05 by weight.

20. The silicate drilling fluid composition according to claim 1, wherein the sulfurized vegetable oil, sulfurized lard oil, sulfurized vegetable esters, and/or sulfurized lard esters are present in an amount of about 10% to about 40% by volume of the lubricant composition.

21. The silicate drilling fluid composition according to claim 1, wherein the modified castor oil is ethoxylated or sulfonated castor oil prepared by reacting ratios of ethylene oxide or sulphuric acid:castor oil in the range of 0.01 to 0.06 by weight.

22. The silicate drilling fluid composition according to claim 1, wherein the modified castor oil is present in an amount of about 2% to about 10% by volume of the lubricant composition.

23. The silicate drilling fluid composition according to claim 1, wherein the carrier oil is present in an amount of about 10% to about 90% by volume of the lubricant composition.

24. The silicate drilling fluid composition according to claim 1, wherein the lubricant composition is present in the silicate drilling fluid composition in an amount of about 5 to about 40 liters per cubic meter of the silicate drilling fluid composition.

25. The silicate drilling fluid composition according to claim 1, wherein the lubricant composition comprises
  (a) sulfurized vegetable oil with 5% sulfur content and a paraffin carrier oil;
  (b) sulfonated castor oil with 0.5% sulfonation degree and a paraffin carrier oil;
  (c) sulfurized vegetable oil with 2% sulfur content and a paraffin carrier oil;
  (d) lecithin and a paraffin carrier oil;
  (e) sulfurized vegetable oil with 5% sulfur content, sulfonated castor oil with 0.5% sulfonation degree and a paraffin carrier oil;
  (f) sulfurized vegetable oil with 5% sulfur content, lecithin and a paraffin carrier oil;
  (g) sulfurized vegetable oil with 5% sulfur content, lecithin, sulfonated castor oil with 0.5% sulfonation degree and a paraffin carrier oil;
  (h) sulfurized vegetable oil with 2% sulfur content, lecithin and a paraffin carrier oil; or
  (i) sulfonated castor oil with 0.5% sulfonation degree and a paraffin carrier oil.

26. The silicate drilling fluid composition according to claim 1, wherein the pre-hydrated clay mineral viscosifier is dehydrated bentonite.

27. The silicate drilling fluid composition according to claim 1, wherein the polymer visocosifier is xantham gum.

28. The silicate drilling fluid composition according to claim 1, wherein the weighting agents are barite or hematite.

29. The silicate drilling fluid composition according to claim 1, wherein the foaming lighting agents are sulfonated surfactants with sulfonation degrees in the range of about 0.3 to about 1.0.

30. The silicate drilling fluid composition according to claim 1, wherein the bridging agents are the calcium carbonate or sulfonated asphalt particles.

31. The silicate drilling fluid composition according to claim 1, wherein the defoamers are alcohol based or silicon based defoamers.

32. A well drilling process comprising circulating the silicate drilling fluid composition as defined in claim 1 in a borehole during drilling.

33. A process for imparting lubricity to an aqueous drilling fluid comprising:
  (a) providing an aqueous drilling fluid comprising a cationic polyacrylamide;

(b) providing a lubricating effective amount of a lubricant composition comprising a carrier oil and one or more lubricants selected from the group consisting of:
   (i) lecithins,
   (ii) sulfurized vegetable oil, sulfurized lard oil, sulfurized vegetable esters, and/or sulfurized lard esters, and
   (iii) modified castor oil; and
(c) introducing the lubricant composition into the aqueous drilling fluid.

34. The process according to claim 33, wherein the lubricant composition comprises a lubricating effective amount of a carrier oil present in an amount of about 10% to about 90% of the lubricant composition and one or more lubricants selected from:
   (i) about 10% to about 40% lecithins;
   (ii) about 10% to about 40% sulfurized vegetable oil, sulfurized lard oil, sulfurized vegetable esters, and/or sulfurized lard esters; or
   (iii) about 2% to about 10% modified castor oil.

35. The process according to claim 34, wherein the lubricant composition comprises (a) sulfurized vegetable oil with 5% sulfur content and a paraffin carrier oil;
(b) sulfonated castor oil with 0.5% sulfonation degree and a paraffin carrier oil;
(c) sulfurized vegetable oil with 2% sulfur content and a paraffin carrier oil;
(d) lecithin and a paraffin carrier oil;
(e) sulfurized vegetable oil with 5% sulfur content, sulfonated castor oil with 0.5% sulfonation degree and a paraffin carrier oil;
(f) sulfurized vegetable oil with 5% sulfur content, lecithin and a paraffin carrier oil;
(g) sulfurized vegetable oil with 5% sulfur content, lecithin, sulfonated castor oil with 0.5% sulfonation degree and a paraffin carrier oil;
(h) sulfurized vegetable oil with 2% sulfur content, lecithin and a paraffin carrier oil; or
(i) sulfonated castor oil with 0.5% sulfonation degree and a paraffin carrier oil.

* * * * *